March 15, 1938.  W. K. MOTE  2,111,030
AGRICULTURAL MACHINE
Filed Oct. 24, 1934  2 Sheets-Sheet 1
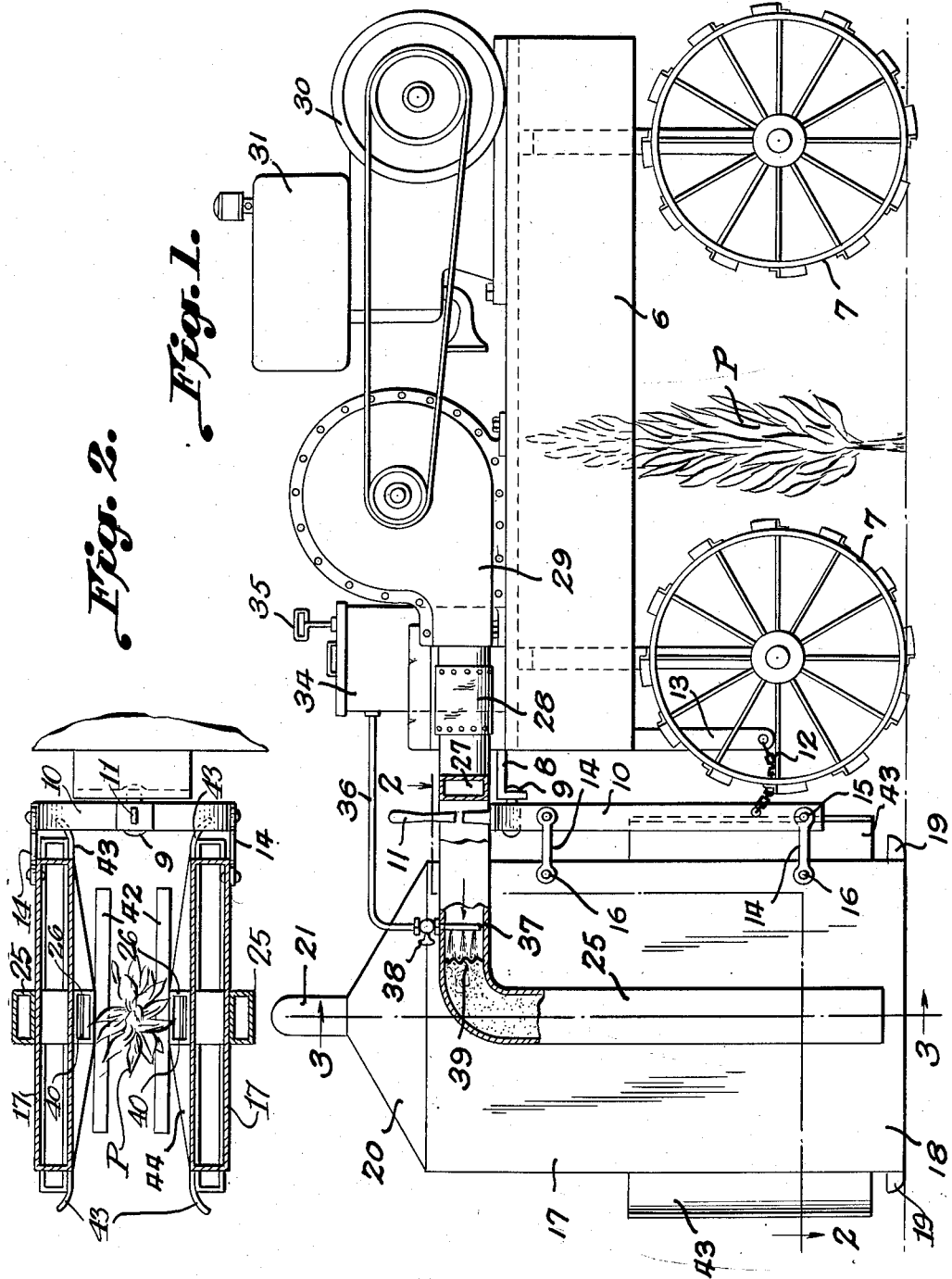
INVENTOR
W. K. Mote March 15, 1938.　　　W. K. MOTE　　　2,111,030
AGRICULTURAL MACHINE
Filed Oct. 24, 1934　　　2 Sheets-Sheet 2
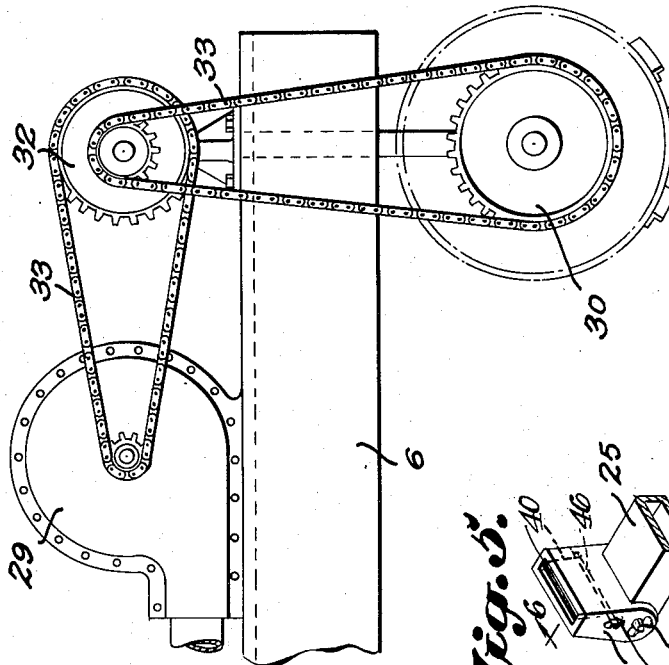
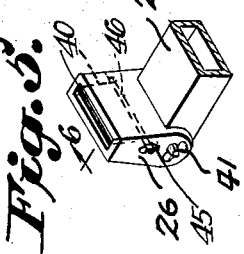
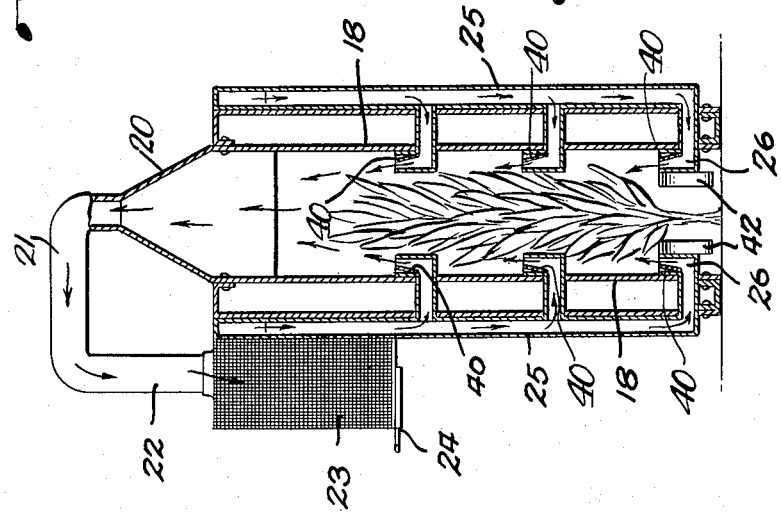
INVENTOR
W. K. Mote Patented Mar. 15, 1938

2,111,030

UNITED STATES PATENT OFFICE 2,111,030

AGRICULTURAL MACHINE

William K. Mote, Cushing, Okla.

Application October 24, 1934, Serial No. 749,799

3 Claims. (Cl. 43—148)

This invention relates to an improvement in agricultural machines adapted for destroying insect pests and for applying insect sprays or dust. An object of the invention is to produce an arrangement of parts in such a machine that it may be used to advantage with crops of varying habits of growth and of various sizes.

A further object of the device is to produce in such a machine an arrangement of parts which make it possible to harvest certain types of crops, such as beans or cotton.

A still further object is to so arrange the insect treating means or work head that it may be guided to accommodate not only row plants but individual plants which may be somewhat out of line in the row.

A further object is to arrange the applicator housing or work head so that it will follow the inequalities of the ground to the extent that the applicator elements, or the crop-picking elements, as the case may be will be presented most advantageously to the plant.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, in which:

Figure 1 is a side elevation of my agricultural machine,

Figure 2 is a section on the line 2—2 of Figure 1,

Figure 3 is a section on the line 3—3 of Figure 1,

Figure 4 is a detailed view showing a modified form of drive between the wheeled vehicle and the blower, Figure 5 is a detailed perspective of a work nozzle; and Figure 6 is a fragmentary section taken on the line 6 of Figure 5.

Referring to the drawings 6 indicates a main frame member carried upon wheels 7 and having an extension 8 and pivot 9 upon which is supported a frame 10 adapted to be swung from side to side by suitable means such as the extended lever 11. The lower end of the frame is limited in its side to side movements by a snubbing chain 12 extending between the wheels to the arm 13.

Drag links 14 are pivoted to the frame at 15 and extend to the pivot 16 on the applicator housing for work head 17. This housing comprises side elements 18 provided with ground runners 19 and joined by a funnel-shaped hood 20 leading into an air duct 21 and from thence downwardly as at 22 to an insect trap or other suitable container 23. The insect trap is provided with a closure 24.

Carried by the applicator housing are air ducts 25 terminating in upturned nozzles 26 between the housing side elements and on either side of an area adapted to span and pass over the plant P which is to be acted upon. The ducts 25 extend vertically through the heighth of the side elements 18 and are then carried rearwardly and through a cross head 27 to a flexible coupling 28 connected with a blower 29 operated by a moving element 30 of the machine.

In Figure 1 this moving element is indicated as the fly wheel of an engine 31 which may be mounted separately on the frame of the chassis or may be driven from the engine of the tractor. In Figure 4 the moving element is secured to one of the wheels of the chassis and drives the blower through suitable gearing 32 and chains 33.

A tank 34 is mounted adjacent the blower and is provided with means 35 for creating a pressure in the tank for expelling the contents thereof which consists of a spray or dust insecticide and which is carried by the pipe 36 to the fluid outlet 37 within the air duct. A valve 38 is inserted in the pipe for controlling the fluid. A screen 39 is mounted in the duct.

Each nozzle 26 has a damper 40 so that the volume and velocity of the air passing therethrough may be controlled and directed. One end of the damper 40 is pivoted as shown at 46, (Figs. 5 and 6) and controllable by a wing-nut, or the like, 45. The nozzle may be pivotally mounted as shown in Figure 5 and secured in adjusted position as by wing nut 41. Fingers 42 are mounted at the lower portion of the applicator housing so that reclining plants may be lifted to a more upright position. Guiding fingers 43 extend into inclined surfaces 44 to insure the central positioning of parts of the plant for proper action thereon of the machine.

When operating my agricultural machine as an insect catcher the air is blown upwardly through the nozzles, preferably through the lower nozzle from adjacent the bottom of the plant upwardly through the plant, to carry the insects over into the cage 23. When operated as an insecticide applicator it may be used to apply either a liquid spray or a dust to such crops as tobacco, corn, cotton, or beans. The nozzle elements are arranged one above the other as shown in Figure 3 so that all parts of the plant are acted upon, and small plants in rows such as bush beans, may be acted upon as well as larger plants.

When my agricultural machine is used as a harvesting machine for cotton, or for cotton bolls, the nozzle elements direct the air thoroughly over the entire plant to remove the ripened cotton, or cotton bolls therefrom and blow them over into a similar container positioned in place of the insect cage 23. This may be a separate vehicle drawn alongside the applicator housing. After the first frost beans may be readily picked from the plants with this machine and the beans blown over through the tube 22 into a container.

While I have set forth certain specific structure it is understood that changes in the details of construction may be resorted to and such changes as fall within the scope of the appended claims, I consider within the spirit of my invention.

Having thus described the invention what is claimed as new is:

1. In an agricultural machine, a work element comprising a housing open at its bottom and at both ends, its top being in the form of an inverted funnel and having an opening therein; an air duct supported on the outside of each of its side members; a plurality of inwardly and upwardly pointing nozzles supported beneath the top of said housing on the inside of each side member, each in communication with the adjacent air duct; and means individual to each nozzle for directing the flow of a fluid emitting therefrom.

2. A unitary portable agricultural machine comprising an air blast unit; a housing having two opposite walls and a funnel like top adapted to pass over and in proximity to growing plants; inwardly and upwardly pointed nozzles carried on the inside of each of said walls beneath said top; air ducts in communication with the nozzles and with the air blast unit; a container; and an independent air duct connecting the top interior of said housing with said container, whereby material blown upward by air emitting from said nozzles may pass from said top through said last mentioned duct to said container.

3. In an agricultural machine, a work element comprising a housing having two opposed side walls; a vertically extending air duct carried exteriorly by each side wall, the upper ends of both ducts being in communication with a common air supply pipe; a plurality of upwardly pointing air nozzles carried interiorly by each side wall, each nozzle being in communication with the nearest of said air ducts; an inverted funnel-like hood bridging the tops of said side walls above said nozzles, constituting the top of said housing, and having an opening therein; a container; and a third air duct forming a communication between the funnel-like hood and the container.

WILLIAM K. MOTE.